United States Patent [19]

Baldecchi et al.

[11] Patent Number: 4,953,828
[45] Date of Patent: Sep. 4, 1990

[54] APPARATUS FOR PRACTICING A PNEUMATIC SUCTION PROCESS PERMITTING DRAWING CABLES THROUGH SHEATHS

[76] Inventors: Sauro S. Baldecchi, 174 Chemin de Gipieres, 06370 Mouans Sartoux, France; Patrick Bourgin, 264 Chemin du Fort Carré, 06140 Vence, France

[21] Appl. No.: 347,037

[22] Filed: May 4, 1989

[51] Int. Cl.$^5$ .............................................. B66F 3/00
[52] U.S. Cl. .................................................. 254/134.4
[58] Field of Search ............... 254/134.3 R, 134.3 FT, 254/134.4

[56] References Cited

U.S. PATENT DOCUMENTS

| | | | |
|---|---|---|---|
| 920,455 | 5/1909 | Greenan | 254/134.4 |
| 2,980,399 | 4/1961 | Littlefield | 254/134.4 |
| 3,091,433 | 5/1963 | Riley, Jr. | 254/134.4 |
| 4,083,533 | 4/1978 | Schwabe | 254/134.4 |
| 4,783,054 | 11/1988 | Morel et al. | 254/134.4 |

FOREIGN PATENT DOCUMENTS

| | | |
|---|---|---|
| 2247493 | 4/1974 | Fed. Rep. of Germany . |
| 2577724 | 2/1985 | France . |
| 2152621 | 8/1985 | United Kingdom ............. 254/134.4 |

Primary Examiner—J. J. Hartman
Attorney, Agent, or Firm—Young & Thompson

[57] ABSTRACT

Device for drawing conductive cables through a sheath by vacuum applied to one end of the sheath, comprising a body of rotation in the form of a cap having a skirt which ensures pneumatic sealing with the interior of the sheath. An anchor extends axially in one direction from the cap and has an opening therethrough in which the cables can be received. An axle extends forwardly in the other direction from the cap, and there is an enlargement on the end of the axle remote from the cap, by which enlargement the device can be grasped for manually pulling on the assembly of the device and the conductive cables drawn thereby. This enlargement can be spherical, of about the same diameter as the cap and skirt, or else semispherical and of a diameter about half that of the cap and skirt.

4 Claims, 2 Drawing Sheets

U.S. Patent  Sep. 4, 1990  Sheet 1 of 2  4,953,828
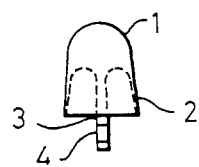
FIG_1
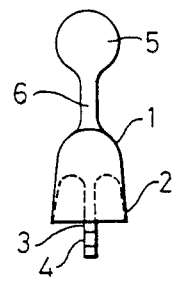
FIG_2
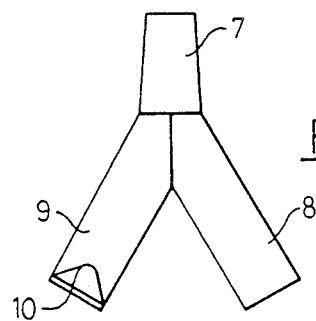
FIG_3
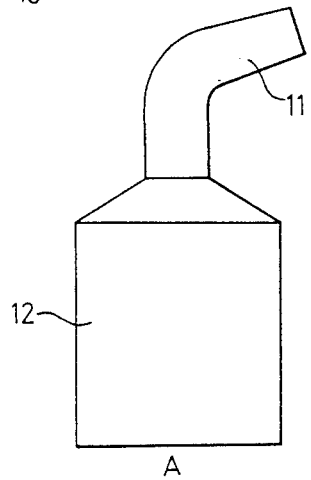
FIG_4

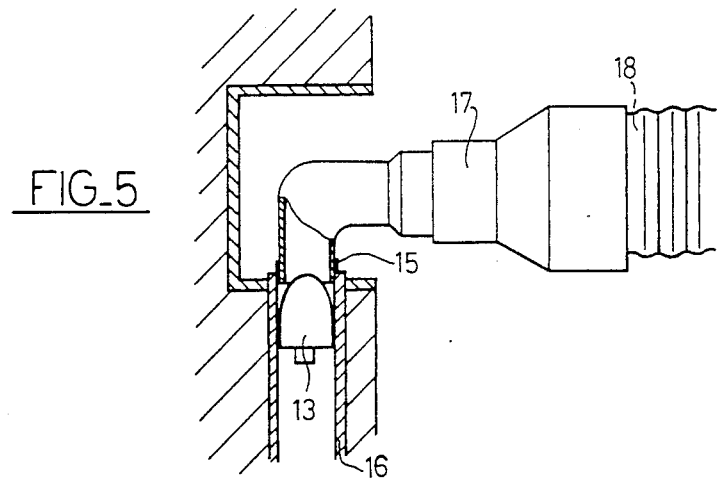
FIG_5
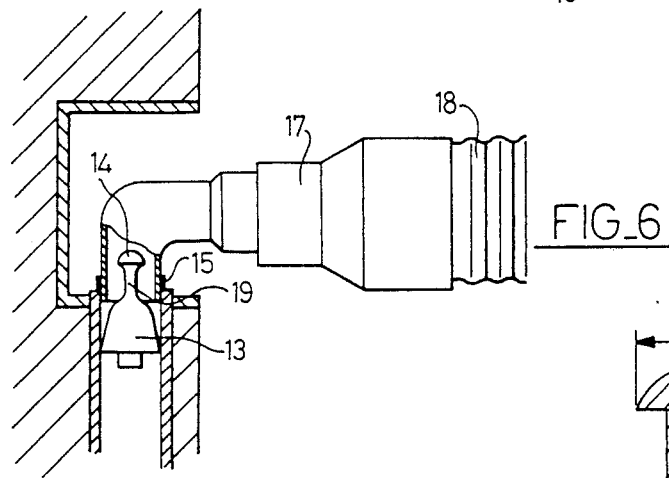
FIG_6
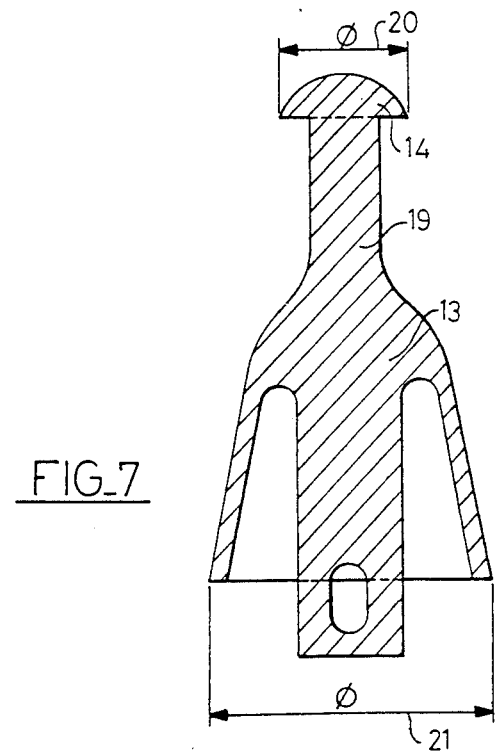
FIG_7

APPARATUS FOR PRACTICING A PNEUMATIC SUCTION PROCESS PERMITTING DRAWING CABLES THROUGH SHEATHS

The present invention relates not only to remodeling existing constructions for providing electric installations, but also civil works adapted for the laying of cables in underground sheaths.

According to the type of cable or insulated conductor to be positioned in sheaths or protective casings, there are two methods most used at present:

in small installations of industrial or domestic type, the positioning of the cables in the sheaths or conduits requires the simultaneous and coordinated action of two people: one draws on the leader while the second guides the entrance of the wires or cables to facilitate penetration into the interior of said conduits.

in installations adapted to transmit either small signals over large distances, such as telephone networks, or electric power over a grid, there is utilized as in French Pat. No. 2,577,724 a metallic leader provided with sealing skirts propelled by compressed air obtained with a compressor of sufficient power to draw a leader or a steel rope over a great distance.

Although numerous patents exist on these apparatus or machines adapted for drawing conductors in domestic installations, it should be noted that such apparatus is not found on the market, for example patents Nos. DE-A-No. 2,247,493, U.S. Pat. Nos. 3,091,433 and 3,793,732. These patents all use compressed air with all the known drawbacks and work safety problems imposed by the use of compressed air; the conducted cables are not drawn directly but by a wire pulling leader which is alone pushed by compressed air. Another drawback resides in the fact that the tractive element which draws the wire pulling needle cannot be recovered. Another drawback of compressed air is the fact that it requires a compressor; if the latter is not always available, it is necessary to change compressed air tanks. These tanks of compressed air limit the distance of utilization and are often of insufficient strength unless very heavy tanks are used.

The principal drawbacks of the solutions proposed to now having been seen as comprising weight, complexity of use and cost, a first French patent application has been filed by the present inventors, but seeking to obtain a better quality/price ratio, they have sought other solutions using pneumatic techniques, based on the fact that electrical installers are often provided with a compressor or, even more simple, a vacuum pump.

To utilize the energy transmitted by a pneumatic generator, it is necessary to have a motor, which in this example is a linear motor reduced to its simplest form.

This motor should be capable of drawing the maximum number of insulated conductors provided, as a function of the diameter of the sleeve or all types of cables that can be disposed in said sleeve.

It is also necessary to be able to follow, with these cables or conductors, the smallest radii of curvature such that these will not collapse the conduit.

Under these conditions, it might be supposed that the power required for the pseudo linear motor might be quite high, and thus require pressure of the order of several atmospheres or an unattainable vacuum.

However, experience has shown that in fact the energy necessary under the most difficult and extreme circumstances remains very much below such suppositions, and that a simple vacuum pump of a power lower than 1 kilowatt will permit operation under very good conditions.

This fact is explained in that when one draws the conductors by means of a leader first disposed in a sheath, the effort to be exerted on said leader is determined by the total number of bends in the conduits, because the friction produced by the tension in the leader or in the conductors is additive when pulling.

The present invention thus comprises a tractive element which will be called a "bullet", because of its form and which, secured directly to the conductors, produces no frictional effect which permits a certain speed of sliding and hence as a result diminishes the resistance due to tension.

Moreover, with the aim of reducing the friction of this tractive bullet within the sleeve, the latter may be of a typically self-lubricating material such as "nylon" or "teflon" (trademarks).

Moreover, the use of vacuum, as tractive means for the "bullet" thus permits reducing friction, because only the contact between the "bullet" and the interior of the conduit need be relatively airtight, while in the case of pushing with air pressure, as in certain known tractive means, it is necessary to seal also the whole of the passage of the conductors to be placed in the sleeve.

Moreover, it is to be noted that the deformation of a self-flexible material such as polyethylene is less sensitive under vacuum than under super-atmospheric pressure, which is another advantage of the invention.

Still further, the manipulation of the device according to the invention is simplified because when one uses said device to draw conductive wires from one piece to another, one does not see the arrival of the tractive bullet at the outlet of the sleeve, the user is warned of the arrival of this latter by the characteristic noise made by the vacuum pump when the pneumatic load falls off.

Given the fact that several types of workmen will be present in a building under construction, it should be stated that the use of a vacuum pump according to this process presents no danger, while projection by compressed air can be dangerous if the pneumatic pressure is too high and that one cannot observe the point of emergence of the tractive bullet.

The essential characteristics of the present invention that permit overcoming the recited drawbacks consist in a process which permits the direct drawing of conductive cables into sleeves by means of certain movable elements moved by pneumatic means of the vacuum pump type. This latter is coupled to the sleeve by a series of airtight couplings.

The device for practicing the process permits drawing directly conductive cables into a sheath by means of movable elements that are moved by pneumatic means; the displacement is obtained by pneumatic vacuum produced by a vacuum pump coupled to the sleeve by one or several sealed couplings; the movable member is constituted by a tractive bullet constituted of a cap downwardly prolonged by a skirt, said cap being prolonged axially by an anchor shank provided with an opening.

The tractive "bullet" comprises a spherical head connected to the cap by an axle which permits establishing a second circumference of contact with the interior of the conduit and thus ensures better guidance along long straight lengths by suppressing oscillation, the axis of movement of the tractive "bullet" corresponding exactly to the axis of said conduit.

The tractive "bullet" comprises a hemispherical head.

Another characteristic technique of the invention resides in the fact that according to another embodiment, the cap, or tractive bullet, is connected by an axle to a spherical head.

The diameter of said spherical head is twice as small as the diameter of the cap or of its skirt.

The length of the axle connecting the spherical head and the tractive bullet or ogive is sufficient to permit the spherical head to serve the function of a means to be grasped.

Thus, the point of this difference of diameter between the spherical head and the cap resides in the fact that the cap stops just at the end of the sleeve while the head leaves the sleeve, which permits pulling the assembly manually by using the head as a means to be gripped.

When there is only a cap or a tractive bullet without a head that can be gripped, the cap will stop just at the outlet of the sleeve. It is then difficult to seize said cap of which only the spherical portion emerges without any means that can be gripped.

The pressure means comprises compressed gas, the coupling has a Y-shape, a portion serves for connection, a branch permits the passage of compressed air and the other branch permits the passage of the conductors.

This series of specific couplings, and the series of tractive "bullets" of functional shape, constitute the device for practicing the preceding process, utilizing the effect of vacuum.

In order to describe in detail the invention and make apparent other novel characteristics, there is given by way of non-limiting example an embodiment of the invention shown in the accompanying drawings:

FIG. 1 is a view in elevation of a tractive "bullet" according to the invention.

FIG. 2 is a view in elevation of a modification of the tractive "bullet" adapted for long straight lines.

FIG. 3 is a view in elevation of a modified form of a Y-shaped connection adapted for the use of compressed air.

FIG. 4 is an elevational view of a vacuum connection or sleeve for sheaths of small diameter.

FIG. 5 shows the arrival of the tractive bullet or cap at the outlet of the sheath at the level of the connection with the vacuum pump. This figure shows the difficulty at this point of grasping the cap.

FIG. 6 shows the use of the spherical head of diameter smaller than the diameter of the cap and which serves as a means to be grasped at the outlet of the sheath.

FIG. 7 is a transverse cross section of a cap provided with a spherical head serving as the means to be grasped.

FIG. 1 shows in an elevational view a tractive "bullet" which is a body of revolution in a self-lubricating material. It is constituted by a cap 1 of rounded shape permitting the passage through bends of sheaths without jamming and with a minimum of friction.

This cap 1 is prolonged downwardly by a skirt 2 adapted to ensure sealing between the cap 1 and the interior of the sleeve (not shown). At the center of the cap 1, there is provided an axial elongation or anchor 3 provided with a hole 4 in the form of an opening permitting the simultaneous reception of several conductors or cables. This member is of one-piece construction.

FIG. 2 is an elevational view of a modification of the tractive "bullet" adapted for long straight lines to ensure better guidance and suppression of all oscillatory phenomena. Thanks to the presence of a head 5 of spherical form, there is provided a second contact circumference with the interior of the conduit, and so the axis of movement of the tractive "bullet" corresponds exactly to the axis of said conduit.

Head 5 is connected to cap 1 by an axle 6. Skirt 2 and anchor 3 in which the opening 4 is provided are all similar to FIG. 1.

FIG. 3 shows an elevational view of a modification of a coupling of "Y" shape adapted for the use of compressed air. The coupling is of a semi-flexible or self-lubricating material so as to reduce friction due to misalignment between the cable leaving its bobbin and entering into the sheath, whose connection is effectuated by the portion 7. The branch 8 serves to receive compressed air, while the branch 9 permits the passage of the conductors. This branch 9 has at its extremity a non-return valve 10 which has the purpose of preventing excessive loss of air which would involve too great a loss of compression. Provided for use in a process utilizing compressed gas, this connection is subject to the same criteria of minimum friction as the device for practicing the process involving vacuum.

FIG. 4 shows an elevational view of a coupling or vacuum sleeve for sheaths of diameters smaller than the diameter of the tube of the vacuum pump. The portion 11 adapted to be inserted in sealed relation within the sheath may be elbowed, semi-rigid or flexible by being constructed of rings.

Portion 12 serves to receive the usual conical end of a vacuum tube adapted to create a vacuum in "A".

In FIG. 5, the cap 13 does not have a spherical head 14. Cap 13 thus stops just at the end 15 of the sheath 16 and at the point of connection 17 of the vacuum pump 18.

In FIG. 6, the cap 13 has a spherical head 14. Cap 13 stops just at the end 15 of sheath 16, the spherical head 14 thanks to its axle 19 which connects it to the cap extends beyond the end 15 which permits utilizing said head 14 as a means to be grasped and easily pulled to draw the assembly to recover the end of the conductive cables.

FIG. 6 shows that the diameter 20 of the spherical head is twice as small as the diameter 21 of the cap 13.

What is claimed is:

1. Disposable device for drawing conductive cables through a sheath by means of vacuum applied to one end of the sheath, which is of one-piece construction of self-lubricating plastic, comprising a body of rotation in the form of a cap having a flexibly deformable skirt which flares rearwardly outwardly and which ensures pneumatic sealing with the interior of the sheath, an anchor extended axially in one direction from the cap and having an opening therethrough in which the cables can be received, an axle extending forwardly in the other direction from the cap, and an enlargement on the end of the axle remote from the cap, by which enlargement the device can be grasped for manually pulling on the assembly of the device and the conductive cables drawn thereby, the enlargement having an exposed outermost periphery that is rounded.

2. Device according to claim 1, in which the enlargement is spherical and of about the same diameter as the cap.

3. Device according to claim 1, in which the enlargement is hemispherical.

4. Device according to claim 3, in which the hemispherical enlargement is of a diameter substantially smaller than that of the cap.

* * * * *